Dec. 3, 1968  E. G. U. GRANRYD  3,413,815
HEAT-ACTUATED REGENERATIVE COMPRESSOR FOR REFRIGERATING SYSTEMS
Filed May 2, 1966  2 Sheets-Sheet 2

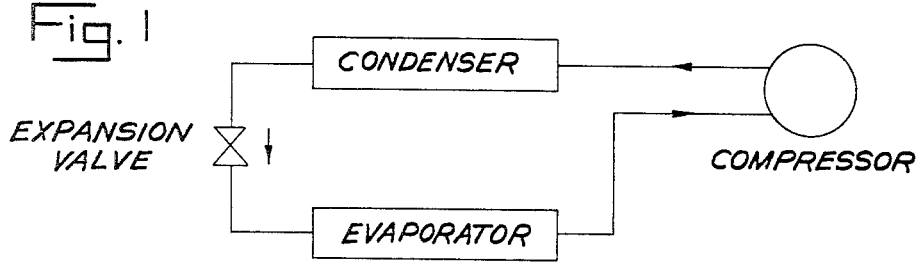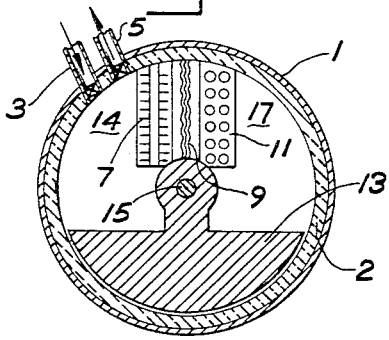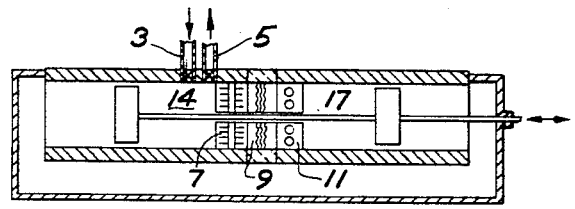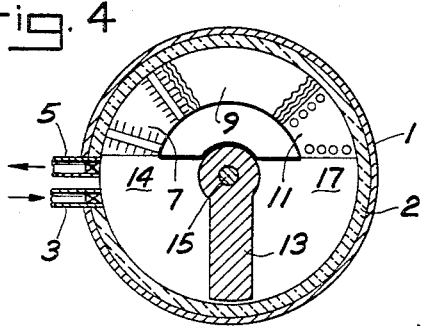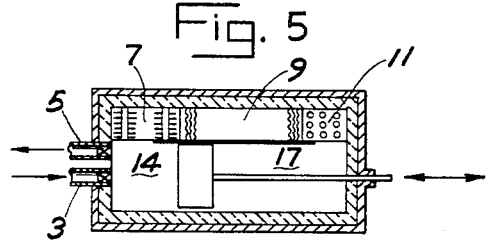

P-V DIAGRAM

INVENTOR.
ERIC G.U. GRANRYD
BY Bair, Freeman
& Molinare
ATTORNEYS

United States Patent Office 3,413,815
Patented Dec. 3, 1968

3,413,815
HEAT-ACTUATED REGENERATIVE COMPRESSOR FOR REFRIGERATING SYSTEMS
Eric G. U. Granryd, Chicago, Ill., assignor, by mesne assignments, to American Gas Association, Inc., New York, N.Y., a not-for-profit corporation of New York
Filed May 2, 1966, Ser. No. 547,040
7 Claims. (Cl. 62—6)

ABSTRACT OF THE DISCLOSURE

A compressor used in a cooling system of the type which includes a gas compressor, an evaporator, a condenser, and a fluid throttling member between the evaporator and the condenser. The compressor is a heat actuated regenerative compressor and includes a chamber for confining gas, a valve in the chamber for regulating the flow of gas into and out of the chamber, a member for displacing the gas within the chamber, means in the chamber for heating the gas, means in the chamber for cooling the gas and a heat regenerator in the chamber, the regenerator being adjacent to and between the heating and cooling means.

---

This invention relates to a novel air conditioning and refrigeration system and in particular to such a system using a novel heat-actuated regenerative compressor as the compressor means.

Cooling systems in general comprise four basic elements: a compressor for taking a gas at a first relatively low pressure and compressing it to a second relatively high pressure; a condenser, normally water or air cooled, for cooling and liquefying the compressed gas to remove the latent heat of vaporization; a throttle valve through which the liquefied gas is expanded into a zone of relatively low pressure; and an evaporator in which the expanded gas absorbs its latent heat of vaporization from the surroundings to be cooled.

The object of this invention is to provide a simple and efficient cooling system compressor means, which can also be used as a heat pump, driven directly by thermal energy. The compressor can be used in conjunction with conventional cooling systems employing well-known gases as refrigerant, e.g. sulfur dioxide or carbon dioxide. Compared to conventional absorption refrigeration systems, the system of this invention does not possess the limitation regarding attainable coefficient of performance (C.O.P.) as is characteristic for absorption systems where normally the C.O.P. number theoretically cannot be greater than 1.

In the cooling system of this invention, a heat-actuated regenerative compressor (HARC) is used. The compressor works on a constant volume-constant pressure cycle with internal heat regeneration and uses the refrigerant vapor as the working medium. The principle and operation of the novel compressor is discussed in detail hereinafter.

By way of background, heretofore heat-actuated regenerative compressors have been used in the art to compress gases for running turbines or other devices requiring a source of high pressure gas. Two such devices are described in U.S. Patents Nos. 2,157,229 and 2,992,536. The compressors described therein comprise basically (1) a gas chamber having a displacer means to displace the gas intermittently from one end of the chamber to the other, (2) heating and cooling means at either end of the chamber and (3) a regenerator between the heating and cooling means. In the prior art devices, the compressors include a reciprocating cylindrical-shaped piston means which functions as a gas displacer within a cylindrical gas chamber, and the heat exchangers are placed in the annular space between the displacer and the walls of the gas chamber. A water jacket is positioned at the cold end of the cylinder in order to cool gas at that end, and a gas-fired burner is at the other end of the cylinder to heat the gas at that end. The heat regenerator is located in the annular space between the hot and cold ends and the gas intermittently passes through the regenerator as it is displaced from the hot to the cold end of the chamber and vice versa. The heat regenerator serves as a heat reservoir.

The prior art devices operate inefficiently with a refrigeration or cooling system. The device of my invention, on the other hand, is designed for practical efficient operation with refrigeration or cooling systems.

The desirable features of my compressor are many. First of all, my compressor is equipped with heat exchangers (heater, regenerator and cooler) with high transfer capacities to transfer heat into and out of the working fluid without excessive temperature difference. Especially in the cooler and regenerator, the temperature differences are kept minimal to achieve good performance, high efficiency and high attainable pressure ratios. In addition, the compressor of my invention has a high pressure ratio at a given ratio between heater and cooler temperatures since the compressor design provides a low "dead volume" ratio. "Dead volume" ratio is the ratio of volume of non-displaced fluid in the compressor, mainly voids in heat exchangers, to the total compressor volume. This is particularly important for a compressor in an air conditioning system where normally the total pressure ratio is determined by the condenser and evaporator temperatures. Further, the power requirement to drive the displacer in my device is minimal because the pressure drop in the heat exchangers is minimized. Also, the design of my device provides for minimum heat losses from hot to cold side of the compressor since heat conduction between the two sides and thermal cycling of the walls is minimized. Finally, by my design, leakage at the seals for the rod or shaft for displacer movement is substantially eliminated.

In the drawings:

FIG. 1 is a schematic diagram showing a conventional cooling system in which the novel heat actuated regenerative compressor of my invention can be used;

FIG. 2 is a schematic end view cross section of a preferred embodiment of my invention;

FIG. 3 is a schematic side view cross section showing another embodiment of my invention.

FIG. 4 is a schematic end view cross section showing another embodiment of my invention;

FIG. 5 is another schematic side view cross section showing an embodiment of my invention;

FIG. 6 is a temperature-entropy diagram showing typical cooling and power cycles using the compressor of my invention;

Figure 7:
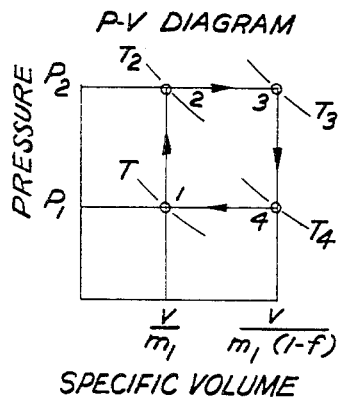
FIG. 7 is a pressure-volume diagram showing a typical cycle of a heat actuated regenerative compressor.

A system for a heat actuated cooling cycle is shown schematically in FIG. 1. The cooling cycle is identical to a conventional compressor system with a condenser, expansion valve, and evaporator as shown. The compressor of my invention, however, is heat actuated and uses the refrigerant vapor as the working medium.

FIG. 2 shows a preferred embodiment of the compressor of my invention. The compressor comprises an outer shell casing 1 of cylindrical configuration which has an internal layer of insulation 2 defining a gas chamber. Communicating with the chamber are check valves 3 and 5 which open as described hereinafter. A cooler section 7, a regenerator section 9 and a heater 11, are arranged at the top of the compressor as shown in FIG. 2.

Positioned on the longitudinal axis of cylinder 1 is a moving vane 13 which has an arcuate lower perimeter designed to be congruent with the internal insulation wall 2. Moving vane 13 acts as a displacer pushing the gas enclosed in working space from the cold part of the cylinder 14 through the cooler, the regenerator and the heater into the hot section 17. The pressure in the cold and hot sections are equal, neglecting the pressure drop through the heat exchanger. For this reason, little power is required to move the displacer, and the clearance of the displacer is not critical. The displacer is driven back and forth in reciprocating fashion by rotation of shaft 15 with a suitable mechanical linkage (not shown) by means of an external electric motor or an expansion motor using the high pressure gas as a driving medium.

For simplicity, the following description is made for a one-stage compressor, although it will be understood that multi-stage compressors are also operable. The power cycle in the compressor is represented by FIG. 6 which shows the cooling and power cycles in a temperature-entropy diagram. The power cycle is also shown in FIG. 7 on a pressure-volume diagram. When displacer 13 moves the gas to the hot end 17 of the cylinder, the mean temperature of the enclosed gas increases and, since its volume is constant, its pressure increases. When the pressure in the system reaches the condenser pressure (point 2 FIG. 9), high pressure check valve 5 opens to permit the compressed gas to escape from the working space. As the mean gas temperature is increased further, a certain fraction of the initially enclosed gas is "delivered" to the condenser. The pressure in the system during this part of the cycle corresponds to the pressure in the condenser.

When the displacer reaches the end of this stroke (point 3), it reverses direction, pushing the gas back through the heat exchanger to cool it, decreasing the means temperature and consequently the pressure. Refrigerant vapor enters through low pressure check valve 3 when the pressure in the cylinder is equal to or somewhat lower than the pressure in the evaporator (path 4–1). The cycle is then repeated.

The regenerator acts as accumulator which stores heat energy that must be rejected from the gas over the path 3–4–1. This stored energy is returned to the working fluid along path 1–2–3. The temperatures and specific volume in the cycle shown in FIG. 7 represent the mean values of the enclosed gas, since different parts of the gas are different temperatures. To obtain a high ratio of mean temperatures, $T_3$ to $T_1$, the "dead volume" of the gas in the heat exchangers must be minimized which requires a heat exchanger design that will produce a high heat exchange rate while having a low pressure drop and a low void volume.

As can be seen from the above description of the preferred embodiment of my compressor, the mechanical and physical orientation of the elements satisfy the requirements for an effective device hereinbefore set out. The motion of the displacer is angular and the drive shaft for the displacer can be sealed to the outside by standard shaft sealing means for a rotating shaft. This is more efficient and simpler than a seal for a reciprocating rod. The displacer may be positioned by ball bearings. As hereinafter noted, the rotating shaft arrangement is particularly convenient when using multistage compressor devices. The displacers can then be balanced for the different stages by arrangement for counterdirectional motion.

The heat exchanger bundle comprises a rectangular package with the heater, regenerator and cooler having a large frontal area necessary for small pressure drop of gas flowing therethrough. The cooler is preferably a finned tube heat exchanger with close-spaced fins. Narrow spacing between the fins is essential for high heat transfer coefficients. Void volume of gas in the cooler with a given capacity is inversely proportional to the square of the spacing between fins and thus the finned cooler with close-spaced fins gives a low void volume per heat exchange capacity.

The regenerator of my device is preferably flat or corrugated stainless steel wire cloth or fine wire mesh arranged in separated layers with essentially no direct contact between each layer in order to decrease heat conduction from hot to cold side. The large frontal area permits small pressure drop for gas flowing through the regenerator resulting in small power requirement to drive the displacer and the use of fine wire permits small void volume in the regenerator.

The heater is preferably a tube bundle heater, gas fired from within. Increased heat transfer can be achieved by employing a radiation shield of wire cloth surrounding the heater tubes which also prevents radiation from unduly heating the adjacent cylinder walls and regenerator section.

The arrangement of elements shown in FIG. 2 results in a configuration of heat exchangers, particularly the cooler and regenerator, permitting the smallest possible channel hydraulic diameters $d_e$. I.e. the void volume in a cooler with given capacity and application is proportional to $1/d_e^2$, if flow is laminar. In a simple and economic way this can be achieved by using a cooler consisting of tubes with close-spaced fins. For instance, tubes with 36 fins per inch where the free distance between two fins will be 0.018–0.020 inch meets the requirements of my design.

With respect to power requirements, for given devices the power requirement to drive the displacer is approximately proportional to $1/A_{fr}^2$ where $A_{fr}$ is the frontal area for the heat exchangers. Therefore, a big frontal area is required. Both the large frontal area and the small channel hydraulic diameter necessarily results in a short flow length in the heat exchanger package, as shown in FIG. 2.

FIGS. 3, 4 and 5 show alternative embodiments of a compressor design of my invention with numerals indicating the parts of FIGS. 3, 4 and 5 corresponding to the same numerals and parts in FIG. 2. The embodiments of FIGS. 3 and 5 utilize a reciprocating piston arrangement rather than a rotating vane. FIG. 4 is similar to FIG. 2 except that the width of the displacer is less and the heat exchange section is correspondingly larger. The arrangement of FIG. 5 must incorporate channels between the cylinder end and the heat exchangers which increases the dead volume ratio and the pressure drop and is thus somewhat less desirable than the configuration shown in the preferred embodiment of FIG. 2.

The embodiment of FIG. 3 has all the advantages of the compact heat exchange sections of the preferred embodiment except that there is a problem with leakages at the two end pistons. The pressure differences over the end pistons is of a higher order of magnitude than over the displacers in alternative embodiments of FIGS. 2, 4 and 5 and has a more severe influence on performance.

Leakages from hot to cold side between the displacer and cylinder walls in all the embodiments are not severe and can to a certain degree be tolerated. Since the pressure drop for fluid passing through the heat exchangers can be kept small, on the order of 1 to 2 inches of water, the clearance between the displacer and the walls is not very critical. Clearances of the order of 0.010–0.020 inches can be tolerated.

In all of the embodiments shown in FIGS. 2 through 5, it is desirable as above noted that the cooler be a finned tube heat exchanger with flat rectangular fins of well known type to those skilled in the art. The fins should be of the closest possible spacing, for instance 36 fins per inch of tube. Tube material is preferably copper or aluminum but can be any other metal well known in the art for use in making heat exchangers.

The regenerator is desirably a matrix of stainless steel wire cloth, for example 150 x 150 inches of wire of diameter about 0.0026 inches arranged in layers. Between layers of wire cloth a coarse wire mesh may be used to decrease heat conduction in the direction parallel to gas flow. To further decrease pressure drop, corrugated wire mesh can be used. This may increase the fluid flow frontal area by a factor of about 2, decreasing the pressure drop to almost ¼ of that when using an uncorrugated surface.

The heater is desirably a tube bundle type heater as noted above. To increase the heat transfer capacity the heater is preferably surrounded by one or more layers of wire mesh similar to the type used in the regenerator. This wire mesh absorbs heat radiated from the tubes which at high temperatures is substantial. The wire mesh is in turn cooled effectively by the gas flowing through it and acts thus as an extended heat exchange surface. This is a simpler and cheaper arrangement than a regular extension of tube surface fins.

The cylinder lining and the displacer may be built directly of a rigid insulating material capable of withstanding high temperatures and thermal shocks. One such material is calcium silicate reinforced with asbestos fibers or calcined diatomaceous silica bonded with asbestos coated with a high temperature gas impervious coating. Another material is fused silica glass which has been foamed to a cellular structure. The cylinder lining is supported on the outside by an outer metal casing as above described.

Figure 9:
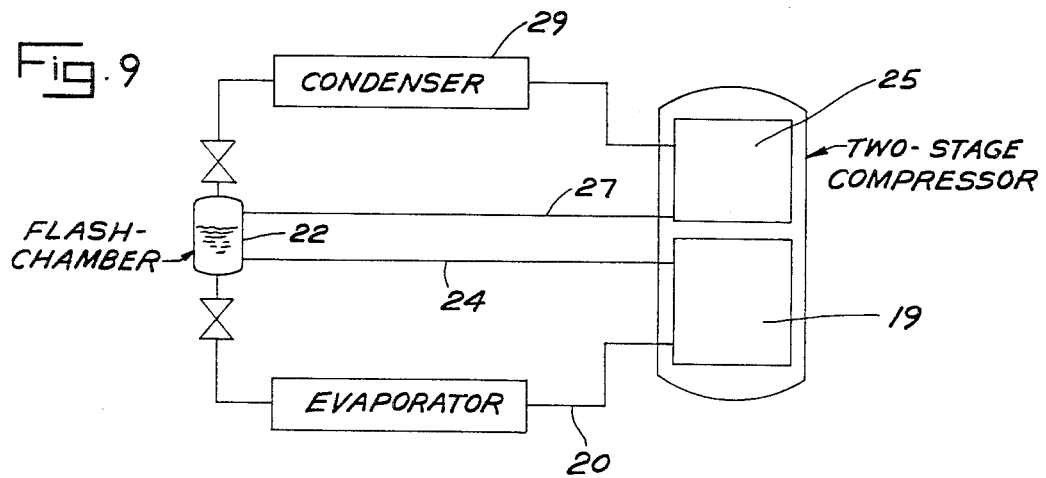
FIG. 9 is a diagrammatic sketch showing an embodiment of my invention utilizing a two-stage compressor device.

A more efficient operation of the cooling system of my invention is possible by using two or more compressors in series. FIG. 9 shows schematically a system in which a two-stage compressor device is used. The first stage compressor 19 takes in low pressure gas from the evaporator through line 20 and exhausts relatively higher pressure gas to the flash chamber 22 through line 24. The second-stage compressor 25 takes in relatively low pressure gas at line 27 from the flash chamber and exhausts high pressure gas into condenser 29. The two stages are arranged with the displacers on the same shaft working 180° out of phase with each other.

Figure 8:
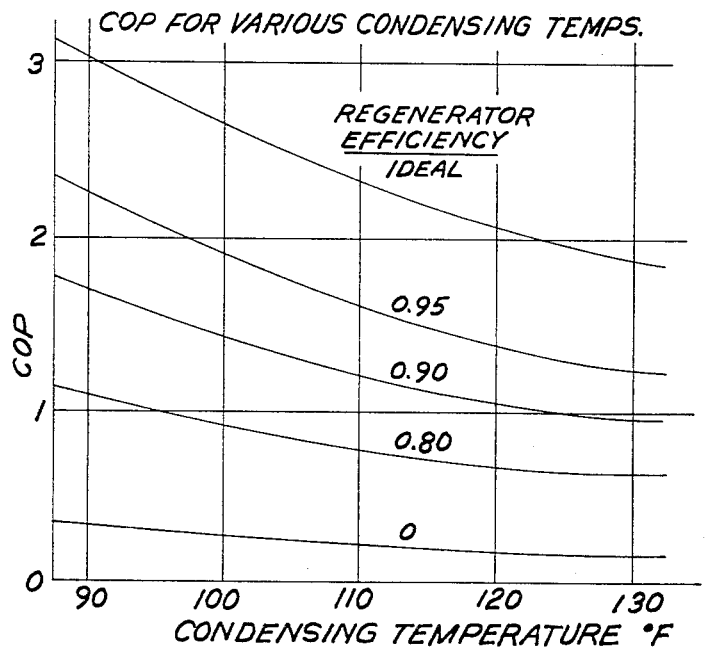
FIG. 8 is a diagram showing coefficient of performance for various temperatures and regenerator efficiency using heat actuated regenerative compressors.

As can be seen from the above description of my invention, there is provided a cooling system capable of highly efficient performances. The influence of the regenerator efficiency and the condensing temperature on the estimated C.O.P. is shown in FIG. 8. As can be seen therefrom, the regenerator efficiency has a very significant influence on the C.O.P. The C.O.P. decreases further slowly when the temperature difference between the condenser and evaporator increases as in a conventional compressor-refrigerating system. The data for plotting FIG. 8 are based on an evaporator temperature of 45° F., $SO_2$ as refrigerant, a two-stage compressor arrangement and a delivered fraction, $f=0.3$.

Having disclosed my invention, I claim:

1. A process for compressing a gaseous refrigerant, said process comprising the steps of providing a heat actuated regenerative compressor having heating means, cooling means, and a heat regenerator therein, intermittently heating and cooling said gaseous refrigerant by contact therewith with said heating means, said cooling means, and said heat regenerator, carrying out both said heating and said cooling steps initially at a constant volume and then at a constant pressure, accumulating heat released from said gaseous refrigerant during said cooling step with said heat regenerator, and returning said accumulated heat from said heat regenerator to said gaseous refrigerant during said heating step.

2. A compressor useful in a cooling system of the type including a gas compressor, an evaporator, a condenser, and a fluid throttling means between the evaporator and the condenser, said compressor being a heat actuated regenerative compressor and comprising a chamber for confining gas, valve means in said chamber for regulating the flow of gas into and out of said chamber, means for displacing gas within said chamber, heating means in said chamber for heating said gas, cooling means in said chamber for cooling said gas, and a heat regenerator in said chamber, said regenerator being adjacent to and between said heating and cooling means.

3. The compressor of claim 2 wherein said chamber for confining gas is a cylindrical chamber, said gas displacing means is a movable vane having an arcuate surface congruent with said cylindrical chamber and is adapted to reciprocate within said chamber between preselected angular limits in a direction perpendicular to the longitudinal axis of said chamber, and said heating means, cooling means and heat regenerator are positioned in said cylindrical chamber for contacting gas displaced by said displacer means moving between said angular limits.

4. The compressor of claim 2 wherein said means for displacing gas within said chamber comprises a piston adapted to reciprocate between preselected limits to displace gas in contact with said heating means, cooling means and heat regenerator.

5. The compressor of claim 2 wherein said compressor is a two-stage heat actuated regenerative compressor wherein the first stage takes in gas from said evaporator at a relatively low pressure and exhausts gas at an intermediate pressure, and wherein the second stage takes in gas at said intermediate pressure and exhausts gas at a relatively high pressure to said condenser.

6. The compressor of claim 2 wherein said means for displacing gas within said chamber comprises a pair of opposed piston heads adapted to reciprocate between preselected limits on a fixed axis to displace gas in contact with said heating means, cooling means and heat regenerator.

7. The compressor of claim 2 wherein said chamber for confining gas is a cylindrical chamber, said gas displacing means is a vane adapted for angular rotation in said cylinder about the longitudinal axis of said cylinder between preselected angular limits of rotation and said heating means, cooling means and heat regenerator means are positioned within said cylindrical chamber for contacting gas displaced by said moving vane moving between said preselected angular limits.

References Cited
UNITED STATES PATENTS

| | | | |
|---|---|---|---|
| 2,272,925 | 2/1942 | Smith | 62—6 |
| 2,764,877 | 10/1956 | Kohler | 62—6 |
| 3,145,527 | 8/1964 | Morgenroth | 62—6 |
| 3,285,001 | 11/1966 | Turnblade | 62—402 XR |

MEYER PERLIN, *Primary Examiner.*